March 17, 1953  R. E. BRUCE ET AL  2,631,437
LIQUID METERING DISPENSER
Filed Dec. 24, 1948
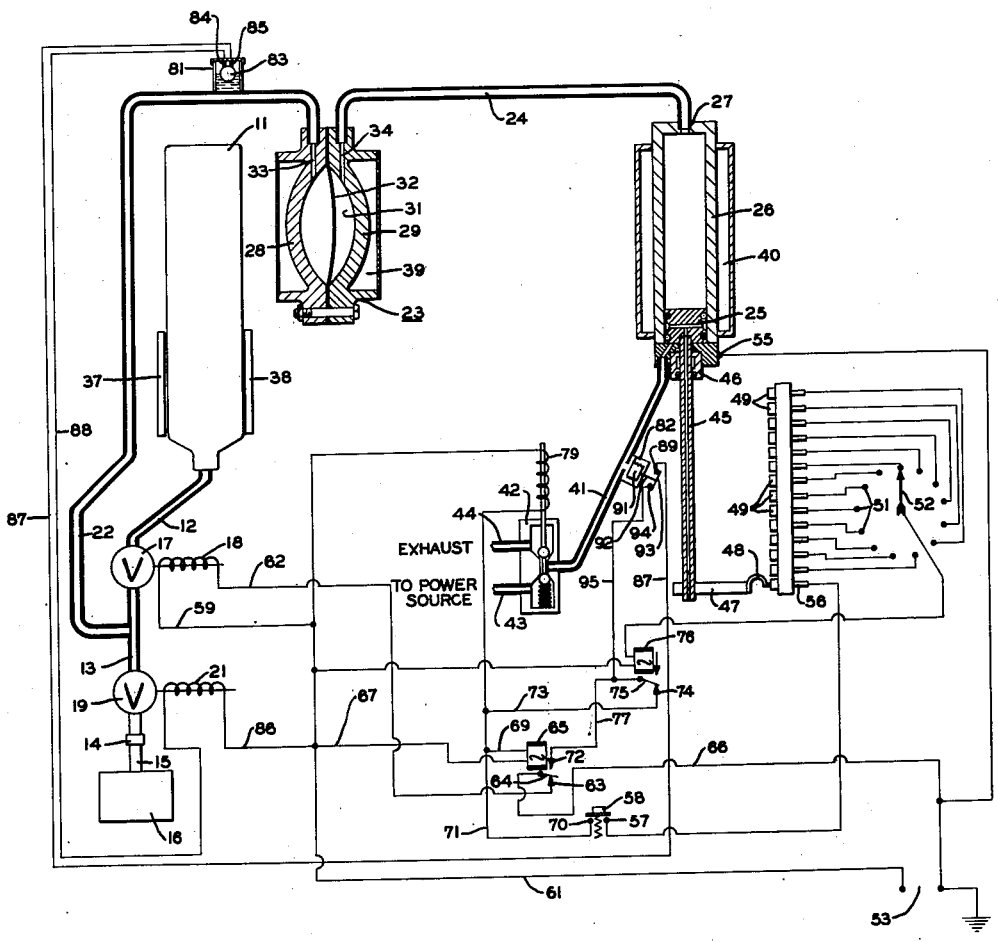
INVENTOR.
RALPH E. BRUCE
ROBERT S. GOEBEL
BY Clarence B. DesJardins
THEIR ATTORNEY Patented Mar. 17, 1953

2,631,437

UNITED STATES PATENT OFFICE 2,631,437

LIQUID METERING DISPENSER

Ralph E. Bruce and Robert S. Goebel, Dayton, Ohio, assignors to Production Control Units, Dayton, Ohio, a firm composed of Ralph E. Bruce, Robert S. Goebel, and Clifford H. Myers Application December 24, 1948, Serial No. 67,156

13 Claims. (Cl. 62—2)

This invention relates to a liquid metering dispenser and particularly concerns apparatus for dispensing predetermined measured quantities of liquid under pressure.

In charging measured quantities of liquid under pressure into a receiving unit, as when charging a refrigerant liquid into a refrigerating unit, several difficulties have been encountered, particularly where the liquid has a relatively low boiling point so it tends to flash into its gaseous state under ambient temperature and pressure conditions.

Liquid meters presently available on the market are not adaptable for measuring liquids under high pressures, especially if said liquids have little or no lubricating qualities or are corrosive in nature, because the seals for the moving parts of the meters are not effective to retain the liquids. Leaks around the seals and elsewhere result in loss of the liquid being measured and also cause inaccuracies in the measurement of the quantity of liquid being dispensed. In efforts to solve this problem, an attempt was made to draw off a predetermined quantity of the liquid to be dispensed, and then discharge that quantity into the receiving unit. This effort was unsuccessful because, here again certain moving parts were necessarily in contact with the liquid being measured, and the resultant leakage could not be avoided. For example, where a cylinder and piston was used as the measuring chamber, leakage occurred around the rings of the piston and there was no way of avoiding said leakage, despite efforts to improve the seal between the piston and the wall of the cylinder.

It is therefore a major object of the present invention to provide apparatus for dispensing measured quantities of liquid under pressure wherein the liquid under pressure is not subject to leakage.

An important object of this invention is to isolate the liquid under pressure being dispensed, from the measuring device for determining the quantity of the liquid being dispensed.

A more specific object of the invention is to provide a system for dispensing liquid, preferably one with good lubricating qualities, under pressure without loss of the liquid due to leakage and in which the dispensing cycle is automatically controlled to dispense a predetermined quantity of liquid and then restore the system to its condition ready to discharge another measured quantity of liquid.

A further object of the invention is to provide such a liquid dispensing system with devices to insure correct pressure and liquid level conditions during discharge of liquid from the system.

In accordance with these objects, certain features of the invention reside in the arrangement of a closed system, without sliding parts, for the liquid under pressure to be dispensed, and another closed system for the measuring device. An isolator unit transmits pressure between the two systems but separates the liquids in these systems. Thus, the liquid to be dispensed is entirely contained within the dipensing system, and the measured quantity is controlled by displacing a predetermined quantity of another liquid with good lubricating qualities into the isolator unit thereby causing a correspondingly measured quantity of the first liquid to be dispensed.

Another feature resides in the automatic control of a cycle of operation of the dispensing apparatus which may be started manually to dispense a predetermined quantity of liquid under pressure into a receiving unit, cuts off the dispenser after that quantity has been dispensed, and restores the apparatus to its original condition ready to dispense another predetermined quantity. Included in the automatic control of the system are safety devices insuring proper pressure in the measuring system and proper liquid level in the dispensing system to avoid incomplete charging of the unit.

Other objects and advantages of the invention will become apparent from the following specification taken in connection with the accompanying drawings, wherein The single figure is a schematic diagram of liquid dispensing apparatus embodying the invention in its preferred form and showing the positions of the mechanical and electrical devices when the apparatus is in its normal or standby condition.

In accordance with this preferred form of the invention, a source of liquid under pressure to be dispensed is connected to a liquid supply line provided with a solenoid controlled liquid supply valve. This line is connected to a liquid dispensing line which is in turn connected to the receiving unit into which liquid is to be dispensed. The liquid dispensing line has a solenoid controlled liquid dispensing valve. Connected in one of the lines between the two valves is a liquid metering line, which is in turn connected to one side of an isolator unit. The other side of the isolator unit is connected to one end of a pressure line, the other end of which is connected to a suitable device for displacing a predetermined measured quantity of liquid from the pressure line into the isolator unit. The isolator unit preferably has an isolating chamber divided by a flexible diaphragm or other flexible partition between the connections for the two liquids. Thus, the isolator chamber has two parts, the relative volumes of which may be varied, within limits, by changing the position of the isolator partition. In the particular embodiment shown in the drawings, the liquid displacing means is in the form of a cylinder with a piston operated by fluid pressure and which moves a measuring contact to control the measured quantity of liquid to be dispensed.

Normally, the supply valve is open and the liquid in the supply container, by its own pressure, which may be developed by heating the container, fills the liquid dispensing system including the measuring line and the side of the chamber on the dispensing side of the diaphragm thereby forcing the measuring liquid out of its side of the isolator chamber so it moves the piston to its standby position, where the largest quantity of measuring liquid is contained in the cylinder. A selector switch, cooperating with the contact on the piston rod, may be adjusted to control the dispensing of a selected measured quantity of liquid. A cycle of operation is then started by closing the supply valve, supplying pressure to the open side of the piston, and opening the dispensing valve. This forces measuring liquid from the piston into the isolator chamber which in turn forces liquid to be dispensed out of the isolating chamber into the measuring line and through the dispensing valve to the receiving unit. When the piston has been displaced a predetermined amount corresponding to the position of the selector switch, thereby displacing a predetermined measured quantity of liquid in the pressure line and into the isolator unit, an electrical connection is made through the contact on the piston rod and the selector switch. This causes the dispensing valve to close, the supply valve to open, and relieves pressure from the open side of the piston. Liquid under pressure in the supply line then passes through the measuring line to the isolator chamber and causes the diaphragm to move in the opposite direction, thereby displacing pressure liquid through the pressure line and moving the piston to its original position where the system remains in standby condition until another cycle of operation is initiated.

Referring now to the drawings for a more detailed description of the apparatus embodying the invention, a supply of liquid is shown at 11 in the form of a bottle in which refrigerants, such as "Freon," are sometimes transported. In industrial installations, this supply is more frequently in the form of a sealed drum. The supply 11 is connected through supply line 12 to a dispensing line 13, which is in turn connected to a suitable coupling 14 for connection to the input 15 of a receiving unit 16. A supply valve 17 is arranged in the supply line 12 and is normally in open position, but may be closed upon deenergization of solenoid 18 which controls the position of the valve 17. A dispensing valve 19 is connected in the dispensing line 13 and is normally closed, but may be opened upon energization of solenoid 21.

Connected to the supply and dispensing lines 12 and 13 between the supply valve 17 and the dispensing valve 19 is a measuring line 22 having its other end connected to an isolator unit indicated generally at 23. Also connected to the isolator unit 23 is a pressure line 24 through which a predetermined measured quantity of liquid may be displaced into the isolator unit 23. This displacement may be effected by a piston 25 reciprocable in cylinder 26 having its closed end connected at 27 to the pressure line 24.

In the form illustrated in the drawings, the isolator unit 23 is composed of two halves 28 and 29 forming between them an isolator chamber 31. This isolator chamber 31 is divided into two parts by a pliable, flexible partition or diaphragm 32, which is clamped between the two halves 28 and 29 to completely separate the two sides of the isolator chamber 31 from each other. The measuring line 22 is connected through a port 33 to one side of the partition or diaphragm 32 in the isolator chamber, and pressure line 24 is connected through port 34 to the isolator chamber at the other side of the diaphragm 32.

Particularly when used for charging refrigerating liquids, such as "Freon," into a refrigerating unit, the source of liquid 11 is maintained at a substantially constant temperature, higher than ambient temperature, as by suitable heater elements 37 and 38. Also, the isolator unit 23 and the cylinder 26 are maintained at a higher temperature than ambient but at a lower temperature than the liquid 11 by supplying heated fluid to a water jacket 39 surrounding the isolator unit and a water jacket 40 surrounding the cylinder. These heating elements are employed to maintain the liquid to be displaced at a constant temperature in order to maintain a constant fluid density. By adjusting the temperature of these water jackets, the system can be put in exact calibration, i. e. the weight of a unit of liquid being dispensed can be made to match the spacing pitch of the contacts which are evenly spaced apart for being contacted by a sliding electrical contactor as hereinafter described.

With the dispensing valve 19 closed and the supply valve 17 open, the pressure of the liquid in the supply container 11 will force refrigerating liquid throughout the measuring system, moving the flexible diaphragm 32 to the right, as shown in Fig. 1, until the liquid in the pressure line 24 has been forced into the cylinder 26 and forces the piston to the bottom of that cylinder thereby filling the cylinder with the pressure liquid. The system remains in this standby condition, completely filled with liquid under pressure, as shown in Fig. 1, until the supply valve 17 is closed and the dispensing valve 19 is opened, when the piston 25 is moved upwardly to displace pressure liquid through the pressure line 24 into the isolator chamber 31. In this way displacement of the pressure liquid causes a corresponding quantity of the liquid to be dispensed into the receiving unit 16. After the predetermined quantity has been so dispensed, movement of the piston 25 is arrested, the dispensing valve 19 is closed, and the supply valve 17 is opened, whereupon, the system is returned to its original condition as shown in Fig. 1.

To automatically control this cycle of operation, the open end of cylinder 26 is connected through a fluid pressure line 41 to a three-way valve 42 by which the cylinder may either be connected through conduit 43 to a fluid pressure source or exhausted to the atmosphere through conduit 44. A piston rod 45, connected to the piston 25, and extending through a suitable packing 46 in the lower end of the cylinder 26, is provided at its outer or lower end with a sliding contact arm 47, carrying an electrical contactor 48. The contactor 48 slides up and down along a series of spaced contacts 49, which are individually connected to corresponding contacts 51, of a rotary selector switch having a selector arm 52. The electrical control system is connected to any suitable power source 53, one side of which is preferably grounded. The ground side is connected at 55 to the cylinder 26 to provide an electrical return circuit for the sliding contact 48, through the arm 47 and the piston rod 45. At the lower end of the contacts 49 to be engaged by the sliding contact 48, there is arranged a similar contact 56, which is connected to one side 57 of a normally open starting switch 58.

With the system in standby condition, as shown in Fig. 1, the supply valve control solenoid 18 is normally energized, by connection, through conductor 59 and common conductor 61, to one side of the power source 53. The other side of the solenoid 18 is connected through conductor 62 to lower contact 63, contactor 64 of normally deenergized starting relay 65, and conductor 66 to the ground side of the power source. Relay 65 is normally deenergized, but may be energized upon depression of starting switch 58, providing contactor 48 is in engagement with the lowermost contactor 56. One side of the relay 65 is connected through conductor 67 to common power line 61. The other side of the relay 65 is connected through conductor 69 and conductor 71 to contact 70 of the starting switch 58. Depression of the starting switch 58 completes the circuit through relay 65, contacts 70 and 57, contact 56, contactor 48, arm 47 and piston rod 45 to the ground side of the power source, thereby shifting contactor 64 away from contact 63 into engagement with its upper contact 72. This shifting of the contactor 64 completes a holding circuit for the relay 65, because the relay remains connected through conductor 67 to one side of the power source, and through conductors 69 and 73, lower contact 74, contactor 75 of relay 76, and conductor 77 to upper contact 72, which is connected through line 66 to the ground side of the power source.

Depression of the starting switch 58 also energizes normally deenergized solenoid 79 for the three-way control valve 42 thereby applying fluid pressure from conduit 43 through conduit 41 to the cylinder 26 and forcing the piston therein upwardly. Even though starting switch 58 is opened, the closure of contactor 64 with contact 72 of the relay 65, completes a circuit for the solenoid 79 through conductor 73, contactor 75, conductor 77, contactor 64 and conductor 66 to the ground side of the power source.

Solenoid 21, for controlling the operation of dispensing valve 19, is normally deenergized, but upon depression of the starting switch 58, and energization of relay 65, the solenoid 21 is energized, provided float switch 81 is closed and also provided pressure switch 82 is closed. The float switch 81 may be in the form of a container having a chamber connected to the measuring line 22 at a high point of the system. In this chamber, there is arranged a float ball 83 which, when sufficient liquid is present in the system, engages contacts 84 and 85 to close the liquid level switch 81. One side of the solenoid 21 is connected through conductors 86 and 61 to the power source, and the other side of the solenoid 21 is connected through conductor 88, contact 84, through the float ball 83, contact 85 and conductor 87 to contact 89 of the pressure switch 82. Pressure switch 82 may be in the form of an enclosed chamber having a port connected to the fluid pressure line 41, and containing a suitable bellows 91 for operating contactor arm 92 which, when there is sufficient pressure in the fluid pressure line 41, will move contactor 93 to close contacts 89 and 94. When the contacts are closed, the circuit for solenoid 21 is connected through lead 95 to lead 77, which, as previously described, is connected to the ground side of the power source through contactor 64, during the time that relay 65 is energized. Thus, during the time that liquid level switch 81 is closed and pressure switch 82 is closed, the solenoid 21 will remain energized thereby opening dispensing valve 19. Should the liquid in the high point of the metering line 22 fall below a predetermined level, or should the pressure in the fluid pressure line 41 fall below a predetermined value, the solenoid 21 will be immediately deenergized, thereby closing the dispensing valve 19 and preventing further discharge of liquid from the dispensing system until such time as the faulty condition is corrected.

With the system in the condition as shown in Fig. 1, liquid under pressure from container 11 entirely fills the dispensing liquid system, the dispensing valve 19 being closed. The pressure of liquid in the dispensing liquid system and the isolating chamber 31 forces pressure liquid through the pressure line 24 and into the cylinder 26, to move the piston 25 to its lowermost position. This is the standby or normal condition of the system. The dispensing liquid system is entirely closed and therefore leakage of the "Freon" or other liquid is avoided. The heaters 37 and 38 maintain a desired temperature and pressure condition of the container 11, and a similar temperature and pressure condition is maintained for the isolating chamber 31 by heat from the water jacket 39. When it is desired to charge a receiving unit 16 with a predetermined measured quantity of liquid, selector switch 52 is adjusted until it engages the contact corresponding to the desired measured quantity of liquid. Then, starting switch 58 is depressed into engagement with contacts 57 and 70, thereby energizing relay 65, so its contactor 64, is moved away from contact point 63, into engagement with upper contact point 72. This locks the relay 65 and deenergizes solenoid 18 so supply valve 17 is closed. The starting switch 58 will be effective to energize the relay 65 only in the event the piston is in its lowermost position so contact 48 is in engagement with contact 56. Thus, a cycle of operation can only be started when the system is in its standby condition, and the liquid displacing piston is in its lowermost position. In addition to energizing relay 65, the starting switch 58 also energizes solenoid 79 to move three-way valve 42 so the conduit 41 is connected to the pressure source from conduit 43. This energization of relay 79 is continued by the lock-in of relay contactor 64 to contact point 72.

Provided the liquid in the system is at the desired level, as determined by float switch 81, and the pressure applied to the cylinder 26 is sufficiently high, as determined by pressure switch 82, the solenoid 21 will be energized to open dispensing valve 19 and permit the discharge of liquid from the dispensing system. In using "Freon" and other low boiling point liquids, it is desired that the pressure be maintained during the entire dispensing operation, otherwise the liquid will flash into a gas as it is dispensed to the receiving unit 16. This situation is avoided by the pressure switch 82 which insures the application of sufficient pressure at all times to prevent flashing of the liquid into a gaseous state. Should the pressure fall below a predetermined minimum, pressure switch 82 will open from contacts 89 and 94, thereby deenergizing solenoid 21, and closing the dispensing valve 19, until such time as the pressure is restored in the system and the dispensing operation will be continued. As the piston 25 moves upwardly, it displaces pressure liquid from the cylinder 26 into pressure line 24 and through port 34 into the pressure liquid side of the diaphragm 32 in isolating chamber 31. The liquid so displaced through the pressure line 24 moves the flexible diaphragm 32 and thereby displaces an identical quantity of liquid from the dispensing side of the isolating chamber, into measuring line 22, and through open dispensing valve 19 to the receiving unit.

When the predetermined measured quantity of liquid has been so displaced, contactor 48 engages the selected contact 49, as determined by the position of selector switch 52, so a circuit is completed through relay 76, which lifts contactor 75 out of engagement with contact 74, thereby deenergizing relay 65, so contactor 64 falls into engagement with contact 63. As a result, the solenoid 79 is deenergized so the cylinder 26 is connected through three-way valve 42 to exhaust conduit 44. Supply valve solenoid 18 is at the same time energized so the supply valve 17 is opened and dispensing valve solenoid 21 is deenergized so the dispensing valve 19 is closed. Then, as the pressure of the liquid in supply 11 is greater than the pressure applied to piston 25 in cylinder 26, dispensing liquid will be supplied through valve 17 and measuring line 22 to the isolating chamber 31, thereby displacing pressure liquid in that chamber through pressure line 24 into the cylinder 26, until the piston 25 comes to rest at the bottom of the cylinder 26. Then, the entire system continues in standby condition until another cycle of operation is initiated by depressing the starter switch 58.

Until the dispensing valve 19 is opened, the dispensing fluid is contained within a closed system, so there can be no leakage. The quantity of dispensing liquid to be measured is determined by the quantity of measuring liquid which is displaced through pressure line 24. The two liquids are separated by the flexible diaphragm 32 in the isolating chamber 31, so the isolating unit provides pressure connection between the two liquids and the quantity of pressure liquid displaced will displace an identical quantity of dispensing liquid. Safety features are provided so the discharge of dispensing liquid from the system will occur only when there is sufficient liquid in the system as determined by liquid level float switch 81, and only when there is sufficient pressure in the system as determined by the pressure switch 82. Operation of the system is started by depressing starting switch 58, and continues through a cycle of operation until the predetermined quantity of liquid has been displaced, as determined by the position of piston 25 and contactor 48 connected to the piston rod 45. After this quantity has been dispensed into the receiving unit, the system is automatically restored to its normal or standby condition.

We are aware that the device herein described is susceptible of considerable variation without departing from the spirit of our invention and, therefore, we have claimed our invention broadly as indicated by the appended claims.

Having thus described our invention, what we claim as new and useful and desire to secure by Letters Patent, is:

1. Apparatus for dispensing to a receiving unit a measured quantity of a liquid under pressure, comprising a liquid dispensing line for connection to the receiving unit, a liquid pressure line, isolating means providing a pressure connection between said lines while maintaining separation of liquids therein, a normally open fill valve connected in said dispensing line between a source of liquid under pressure to be dispensed and said isolating means, a normally closed dispensing valve connected in said dispensing line between said isolating means and the connection for the receiving unit, means for displacing a measured quantity of liquid from said pressure line into said isolating means, and valve control means effective during operation of said last named means for reversing the normal condition of said valves.

2. Apparatus for dispensing to a receiving unit a measured quantity of a liquid under pressure, comprising a liquid dispensing line for connection to the receiving unit, a liquid pressure line, isolating means providing a pressure connection between said lines while maintaining separation of liquids therein, a normally open fill valve for controlling a liquid connection between said dispensing line and a source of liquid under pressure to be dispensed, a normally closed dispensing valve for controlling the discharge of liquid from said dispensing line to the receiving unit, means for displacing a measured quantity of liquid from said pressure line into said isolating means, valve control means effective during operation of said last named means for reversing the normal conditions of said valves to dispense a corresponding measured quantity of liquid from said dispensing line to the receiving unit, and means responsive to the pressure in said pressure line for rendering said control means inoperative when said pressure falls below a predetermined minimum.

3. Apparatus for dispensing to a receiving unit a measured quantity of a liquid under pressure, comprising a liquid dispensing line for connection to the receiving unit, a liquid pressure line, isolating means providing a pressure connection between said lines while maintaining separation of liquids therein, a normally open fill valve for controlling a liquid connection between said dispensing line and the source of liquid under pressure to be dispensed, a normally closed dispensing valve for controlling the discharge of liquid from said dispensing line to the receiving unit, means for displacing a measured quantity of liquid from said pressure line into said isolating means, valve control means effective during operation of said last named means for reversing the normal conditions of said valves to dispense a corresponding measured quantity of liquid from said dispensing line to the receiving unit, and means responsive to the liquid level in said dispensing line for rendering said control means inoperative when the liquid level in said dispensing line falls below a predetermined level.

4. Apparatus for dispensing to a receiving unit a measured quantity of liquid under pressure, comprising a liquid dispensing line for connection to the receiving unit, a liquid pressure line, isolating means providing a pressure connection between said lines while maintaining separation of liquids therein, a normally open fill valve for controlling a liquid connection between said dispensing line and a source of liquid under pressure to be dispensed, a normally closed dispensing valve for controlling the discharge of liquid from said dispensing line to the receiving unit, means for displacing a measured quantity of liquid from said pressure line into said isolating means, valve control means effective during operation of said last named means for reversing the normal conditions of said valves to dispense a corresponding measured quantity of liquid from said dispensing line to the receiving unit, and means for rendering said control means inoperative to reverse the normal conditions of said valves except when the pressure in said pressure line exceeds a predetermined minimum and the liquid in said dispensing line is above a predetermined level.

5. Apparatus for dispensing to a receiving unit a measured quantity of a liquid under pressure, comprising a liquid dispensing line for connection to the receiving unit, a liquid pressure line, an isolating chamber divided by a diaphragm, said dispensing line being connected to said chamber on one side of said diaphragm, said pressure line being connected to said chamber on the other side of said diaphragm, a normally open fill valve connected in said dispensing line between a source of liquid under pressure to be dispensed and said chamber, a normally closed dispensing valve connected in said dispensing line between said chamber and the receiving unit, means for displacing a predetermined measured quantity of liquid from said pressure line into said isolating chamber, and control means effective during operation of said displacing means for reversing the condition of said valves to dispense a corresponding measured quantity of liquid under pressure to the receiving unit.

6. Apparatus for dispensing to a receiving unit a measured quantity of a liquid under pressure, comprising a liquid supply line for connection to a source of liquid under pressure to be dispensed, a fill valve in said supply line, a liquid dispensing line connected to said supply line for dispensing liquid under pressure to a receiving unit, a normally closed dispensing valve in said dispensing line, a liquid measuring line connected to said lines between said valves, an isolator unit connected to said measuring line, a pressure line connected to said isolator unit, said isolator unit providing a pressure connection between said pressure line and said measuring line while maintaining separation of liquids therein, means for displacing a measured quantity of liquid from said pressure line into isolator unit, means operated synchronously with said displacing means for closing said fill valve and opening said discharge valve whereby a corresponding measured quantity of liquid is dispensed through said dispensing valve to the receiving unit.

7. Apparatus for dispensing to a receiving unit a measured quantity of a liquid under pressure, comprising a liquid supply line for connection to a source of supply of liquid under pressure to be dispensed, a normally open fill valve in said supply line, a liquid dispensing line connected to said supply line for dispensing liquid under pressure to a receiving unit, a dispensing valve in said dispensing line, a liquid measuring line connected to said lines between said valves, an isolator unit connected to said measuring line, a liquid pressure line connected to said isolator unit, said isolator unit providing a pressure connection between said lines while maintaining separation of liquids therein, means for displacing a predetermined measured quantity of liquid from said pressure line to said isolator unit, valve operating means for closing said supply valve and opening said dispensing valve, and control means for operating said displacing means and said valve operating means, said control means rendering said valve operating means inoperative when said displacing means has displaced said predetermined quantity of liquid.

8. Dispensing apparatus as defined by claim 6 including means for causing the control means to be operative only when the liquid in said measuring line exceeds a predetermined level.

9. Dispensing apparatus as defined by claim 6 including means for causing said control means to be operative only when pressure applied to said pressure line exceeds a predetermined minimum.

10. Dispensing apparatus as defined by claim 6, including means for causing said control means to be operative only when the liquid in said measuring line exceeds a predetermined level and the pressure applied to liquid in the pressure line exceeds a predetermined minimum.

11. Apparatus for dispensing to a receiving unit a measured quantity of a liquid under pressure, comprising a liquid supply line for connection to a source of liquid under pressure to be dispensed, a supply valve in said supply line, a liquid dispensing line connected to said supply line for dispensing liquid under pressure to a receiving unit, a dispensing valve in said dispensing line, an isolating chamber divided by a flexible diaphragm a measuring line connected to said lines between said valves, the other end of said liquid measuring line being connected to said isolating chamber on one side of the flexible diaphragm, a liquid pressure line having one end connected to said isolating chamber at the other side of said diaphragm, means connected to the other end of said pressure line for displacing liquid therefrom into said isolating chamber, and control means for operating said valves and said liquid displacing means, said control means normally opening said supply valve and closing said dispensing valve, and means for initiating a cycle of operation of said control means to reverse the normal condition of said valves and operate said liquid displacing means to begin dispensing liquid under pressure through said dispensing valve to a receiving unit, and means effective upon displacement of a predetermined measured quantity of liquid by said displacing means for restoring said control means to its initial condition thereby opening said supply valve and closing said dispensing valve.

12. In dispensing apparatus as defined by claim 11 means for causing said restoring means to cause return of displacing means to withdraw the same quantity of liquid from said isolator to said pressure line and thereby replace the dispensed liquid with a corresponding quantity of liquid from the supply.

13. Apparatus for dispensing to a receiving unit a measured quantity of a liquid under pressure, comprising an isolating chamber divided by a flexible diaphragm, a liquid dispensing line for connecting said chamber on one side of the diaphragm to a receiving unit, a liquid pressure means, a liquid pressure line for connecting said chamber on the other side of the diaphragm to the liquid pressure means, and means for maintaining at a desired temperature the liquid pressure means whereby the quantity of dispensed liquid is calibrated to correspond with the quantity of supply liquid.

RALPH E. BRUCE.
ROBERT S. GOEBEL.

REFERENCES CITED

The following references are of record in the file of this patent:

UNITED STATES PATENTS

| Number | Name | Date |
| --- | --- | --- |
| 1,470,381 | Lamb | Oct. 9, 1923 |
| 1,586,770 | Badoux et al. | June 1, 1926 |
| 1,609,015 | Engbrecht | Nov. 30, 1926 |
| 1,939,611 | Purvis | Dec. 12, 1933 |
| 2,331,879 | White | Oct. 19, 1943 |